US010203852B2

(12) United States Patent
Ellbogen et al.

(10) Patent No.: US 10,203,852 B2
(45) Date of Patent: Feb. 12, 2019

(54) CONTENT SELECTION IN WEB DOCUMENT

(71) Applicant: Microsoft Technology Licensing, LLC, Redmond, WA (US)

(72) Inventors: Danielle Lauren Ellbogen, Seattle, WA (US); Mark Benjamin Yalovsky, Seattle, WA (US); Kelly Rose McArthur, Redmond, WA (US); Adam E. Barrus, Redmond, WA (US); Michael John Patten, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 15/163,513

(22) Filed: May 24, 2016

(65) Prior Publication Data

US 2017/0285914 A1  Oct. 5, 2017

Related U.S. Application Data

(60) Provisional application No. 62/314,837, filed on Mar. 29, 2016.

(51) Int. Cl.
*G06F 17/30* (2006.01)
*G06F 3/0482* (2013.01)
*G06F 3/0484* (2013.01)

(52) U.S. Cl.
CPC ........ *G06F 3/04842* (2013.01); *G06F 3/0482* (2013.01); *G06F 17/30899* (2013.01)

(58) Field of Classification Search
CPC ............................ G06F 3/0484; G06F 3/0482
See application file for complete search history.

(56) References Cited

U.S. PATENT DOCUMENTS 6,579,324 B1 * 6/2003 Lowry ................. G06F 17/212
                                                        345/592
6,683,631 B2   1/2004 Carroll
(Continued)

FOREIGN PATENT DOCUMENTS

| CN | 1357846 A      | 7/2002  |              |
|----|----------------|---------|--------------|
| EP | 2921969 A1 *   | 9/2015  | G06F 17/212  |
| WO | 2009009896 A1  | 1/2009  |              |

OTHER PUBLICATIONS

"International Search Report and Written Opinion", Application No. PCT/US2017/023928, dated May 18, 2017, 12 pages.
(Continued)

*Primary Examiner* — Asher D Kells
(74) *Attorney, Agent, or Firm* — David W. Foster; Newport IP, LLC

(57) ABSTRACT

Techniques for selection of content within web documents are described herein. In implementations, a selection tool for a browser or other client application is configured to analyze web documents to recognize different regions in the arrangement of content for the document. The selection tool may parse the underlying structure of a webpage (e.g., the mark-up code and DOM structure) to identify different discrete regions in the webpage. In addition or alternatively, the selection tool may use optical recognition techniques to visually analyze the webpage as it appears when rendered and detect different discrete regions based on the visual analysis. Recognized regions are configured as portions of the content that are individually selectable. These selectable regions may be exposed and made accessible in various ways to enable users to toggle selection of the regions quickly and easily.

20 Claims, 14 Drawing Sheets

(56) References Cited

U.S. PATENT DOCUMENTS

| | | | |
|---|---|---|---|
| 6,996,778 B2* | 2/2006 | Rajarajan | G06F 9/5055 715/734 |
| 7,539,944 B2 | 5/2009 | Gauthier et al. | |
| 8,255,819 B2* | 8/2012 | Chang | G06F 17/30867 715/760 |
| 8,566,704 B1* | 10/2013 | Le Bescond de Coatpont | G06F 17/24 434/345 |
| 8,593,666 B2 | 11/2013 | Xiao | |
| 8,595,635 B2 | 11/2013 | Krzanowski et al. | |
| 8,635,518 B1 | 1/2014 | Bhanoo | |
| 9,164,658 B2 | 10/2015 | Sadhvani et al. | |
| 9,245,274 B2 | 1/2016 | Reavis | |
| 9,619,143 B2* | 4/2017 | Herz | G06F 3/04817 |
| 2007/0130525 A1 | 6/2007 | Murphy et al. | |
| 2008/0055273 A1* | 3/2008 | Forstall | G06F 3/04817 345/173 |
| 2008/0168388 A1* | 7/2008 | Decker | G06F 3/0481 715/800 |
| 2008/0184138 A1* | 7/2008 | Krzanowski | G06F 17/30873 715/760 |
| 2008/0201650 A1* | 8/2008 | Lemay | G06F 17/30884 715/763 |
| 2010/0161670 A1* | 6/2010 | Yurov | G06F 3/0482 707/797 |
| 2012/0010995 A1* | 1/2012 | Skirpa | G06F 3/0481 705/14.49 |
| 2012/0054597 A1* | 3/2012 | Yamada | G06T 11/60 715/234 |
| 2013/0212498 A1 | 8/2013 | Lim et al. | |
| 2013/0238978 A1* | 9/2013 | Jwa | G06F 17/30905 715/234 |
| 2013/0275889 A1* | 10/2013 | O'Brien-Strain | G06Q 30/0269 715/760 |
| 2013/0283148 A1* | 10/2013 | Lim | G06F 17/30896 715/234 |
| 2014/0173483 A1* | 6/2014 | Hicks | G06F 3/0486 715/769 |
| 2014/0281887 A1 | 9/2014 | Chandra | |
| 2014/0324943 A1* | 10/2014 | Antipa | H04L 67/42 709/203 |
| 2015/0066665 A1* | 3/2015 | Long | G06Q 30/0277 705/14.73 |
| 2015/0242372 A1* | 8/2015 | Hattori | G06F 17/212 358/1.18 |
| 2016/0147725 A1* | 5/2016 | Patten | G06F 17/241 715/230 |
| 2016/0162173 A1* | 6/2016 | Chandra | G06F 17/30899 715/747 |
| 2016/0188736 A1* | 6/2016 | Richter | G06F 17/30867 707/728 |

OTHER PUBLICATIONS

"How could you highlight various parts of a text?", Published on: Nov. 10, 2009 Available at: https://autohotkey.com/board/topic/46997-how-could-you-highlight-various-parts-of-a-text/.

"Select Text Like A Pro [OS X Tips]", Published on: Jan. 12, 2012 Available at: http://www.cultofmac.com/138782/select-text-like-a-pro-os-x-tips/.

"Tools 1: Selecting and deselecting", Published on: Aug. 11, 2014 Available at: https://icculus.org/gtkradiant/documentation/q3radiant_manual/ch04/pg4_1.htm.

* cited by examiner

"I"

↓ Refinement Input 1102

"J"

↓ Operations upon Selection 1104

CONTENT SELECTION IN WEB DOCUMENT

This Application claims priority to U.S. Provisional Patent Application No. 62/314,837, filed Mar. 29, 2016, and titled "Content Selection in Web Documents," the disclosure of which is incorporated by reference in its entirety.

BACKGROUND

Individuals may interact with various computing resources, such as desktop applications or web applications available from service providers, to create content (e.g., documents, images, charts, graphs, etc.) and collaborate with other people. In some instances, individuals may interact with web content and make selection of the content to copy/paste, save, share or otherwise use select portions of content. Existing techniques supported by browsers and other applications for selection of web content are crude and often result in unintended and incorrect selections. For instance, it can be difficult to use click and drag techniques to select items precisely within a web page having content structure with different frames, types of content (e.g., text, images, links), alignment of items and so forth.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for selection of content within web documents are described herein. In implementations, a selection tool for a browser or other client application is configured to analyze web documents to recognize different regions in the arrangement of content for the document. The selection tool may parse the underlying structure of a webpage (e.g., the mark-up code and DOM) to identify different discrete regions in the webpage. In addition or alternatively, the selection tool may use optical recognition techniques to visually analyze the webpage as it appears when rendered and detect different discrete regions based on the visual analysis. Recognized regions are configured as portions of the content that are individually selectable. These selectable regions may be exposed and made accessible in various ways to enable users to toggle selection of the regions quickly and easily.

For instance, controls and other functionality operable to refine a selection may be made available responsive to user interaction to specify the selection within a document. The refinement controls/functionality may enable a user to select or deselect individual regions of the content, such as by using check boxes or other toggles. Refinement controls/functionality may also enable a user to expand/contract a selection to encompass different content portions, such as to expand the sequentially outward from a selected phrase, to a sentence, to a paragraph, to multiple regions, and all items by successive interaction with a refinement control, such as a selectable icon, keystrokes, selectable button, and other UI instrumentalities. A selection may also be contracted in a comparable way, such that a user is able to both increase and decrease the amount of content and number of regions included in the selection using one or more refinement controls. In this way, a user can quickly cycle through different selection portions corresponding to different combinations recognized regions and content items contained within web documents presented via a browser or other application.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Existing techniques supported by browsers and other applications for selection of web content are crude and often result in unintended and incorrect selections. For instance, it can be difficult to use click and drag techniques to select items precisely within a web page having a content structure with different frames, types of content (e.g., text, images, links), alignment of items and so forth.

Techniques for selection of content within web documents are described herein. In implementations, a selection tool for a browser or other client application is configured to analyze web documents to recognize different regions in the arrangement of content for the document. The selection tool may parse the underlying structure of a webpage (e.g., the mark-up code and DOM) to identify different discrete regions in the webpage. In addition or alternatively, the selection tool may use optical recognition techniques to visually analyze the webpage as it appears when rendered and detect different discrete regions based on the visual analysis. Recognized regions are defined as portions of the content that are individually selectable. These selectable regions may be exposed and made accessible in various ways to enable users to toggle selection of the regions quickly and easily.

For instance, controls and other functionality operable to refine a selection may be made available responsive to user interaction to specify the selection within a document. The refinement controls/functionality may enable a user to select or deselect individual regions of the content, such as by using check boxes or other toggles. Refinement controls/functionality may also enable a user to expand/contract a selection to encompass different content portions, such as to expand the sequentially outward from a selected phrase, to a sentence, to a paragraph, to multiple regions, and all items by successive interaction with a refinement control, such as a selectable icon, keystrokes, selectable button, and other UI instrumentalities. A selection may also be contracted in a comparable way, such that a user is able to both increase and decrease the amount of content and number of regions included in the selection using one or more refinement control. In this way, a user can quickly cycle through different selection portions corresponding to different combinations recognized regions and content items contained within web documents presented via a browser or other application.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
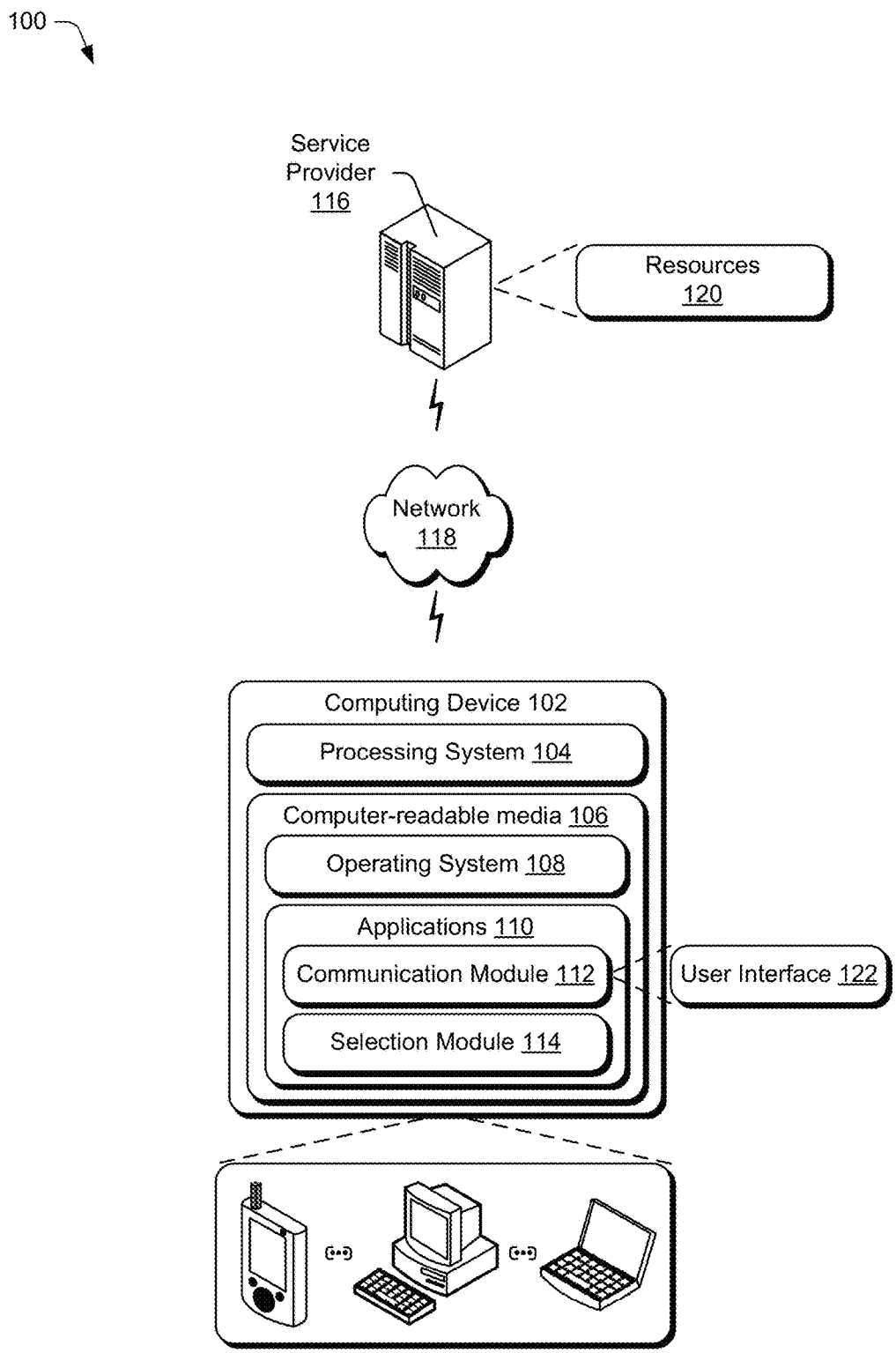
FIG. 1 is an illustration of an environment in an example implementation that is operable to employ techniques described herein.

FIG. 1 illustrates an operating environment in accordance with one or more implementations, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. Additionally, although a single computing device 102 is shown, the computing device 102 may be representative of a plurality of different devices to perform operations "over the cloud" as further described in relation to FIG. 14.

Example applications 110 represented in FIG. 1 include a communication module 112 and a selection module 114. In at least some embodiments, the communication module 112 represents a browser of the computing device operable to access various kinds of web-based resources (e.g., content and services). The communication module 112 may also represent a client-side component or "web-enabled" application having integrated functionality operable to access web-based resources (e.g., a network-enabled application), browse the Internet, interact with online providers, and so forth.

The selection module 114 represents functionality operable to implement techniques for content selection in web documents described above and below. For instance, the selection module 114 is operable to process web content (e.g., webpages, sites, web documents) accessed via the communication module to recognize different content regions contained in the web content. Recognized regions are then exposed in a rendered view of a page or document to facilitate selection of content and refinement of the selection using the regions. In one or more implementations, processing to recognize different content regions includes both (1) analysis of the underlying structure of the content (e.g., the mark-up code and DOM structure) to identify different discrete regions in the webpage, and (2) optical recognition techniques to visually analyze the webpage as it appears when rendered to detect different discrete regions based on the visual analysis. Details regarding techniques implemented via the selection module 114 can be found throughout the discussion below.

The environment 100 further depicts one or more service providers 116, configured to communicate with computing device 102 over a network 118, such as the Internet, to provide a "cloud-based" computing environment. Generally, speaking a service provider 116 is configured to make various resources 120 available over the network 118 to clients. For example, a communication module 110 may be executed at a client to navigate and access various resources 120 from service providers 116 and output a corresponding user interface 122 to expose rendered views through which users may interact with the resources.

In some scenarios, users may sign-up for accounts that are employed to access corresponding resources from a provider. The provider may authenticate credentials of a user (e.g., username and password) before granting access to an account and corresponding resources 120. Other resources 120 may be made freely available, (e.g., without authentication or account-based access). The resources 120 can include any suitable combination of services and/or web content typically made available over a network by one or more providers. Some examples of services include, but are not limited to, a photo editing service, a web development and management service, a collaboration service, a social networking service, a messaging service, an advertisement service, and so forth. Web content may include various combinations of text, video, ads, audio, multi-media streams, animations, images, web documents, web pages, applications, device applications, and the like.

Having considered an example environment, consider now a discussion of some example details of techniques for in accordance with one or more implementations.

Implementation Details

Figure 2:
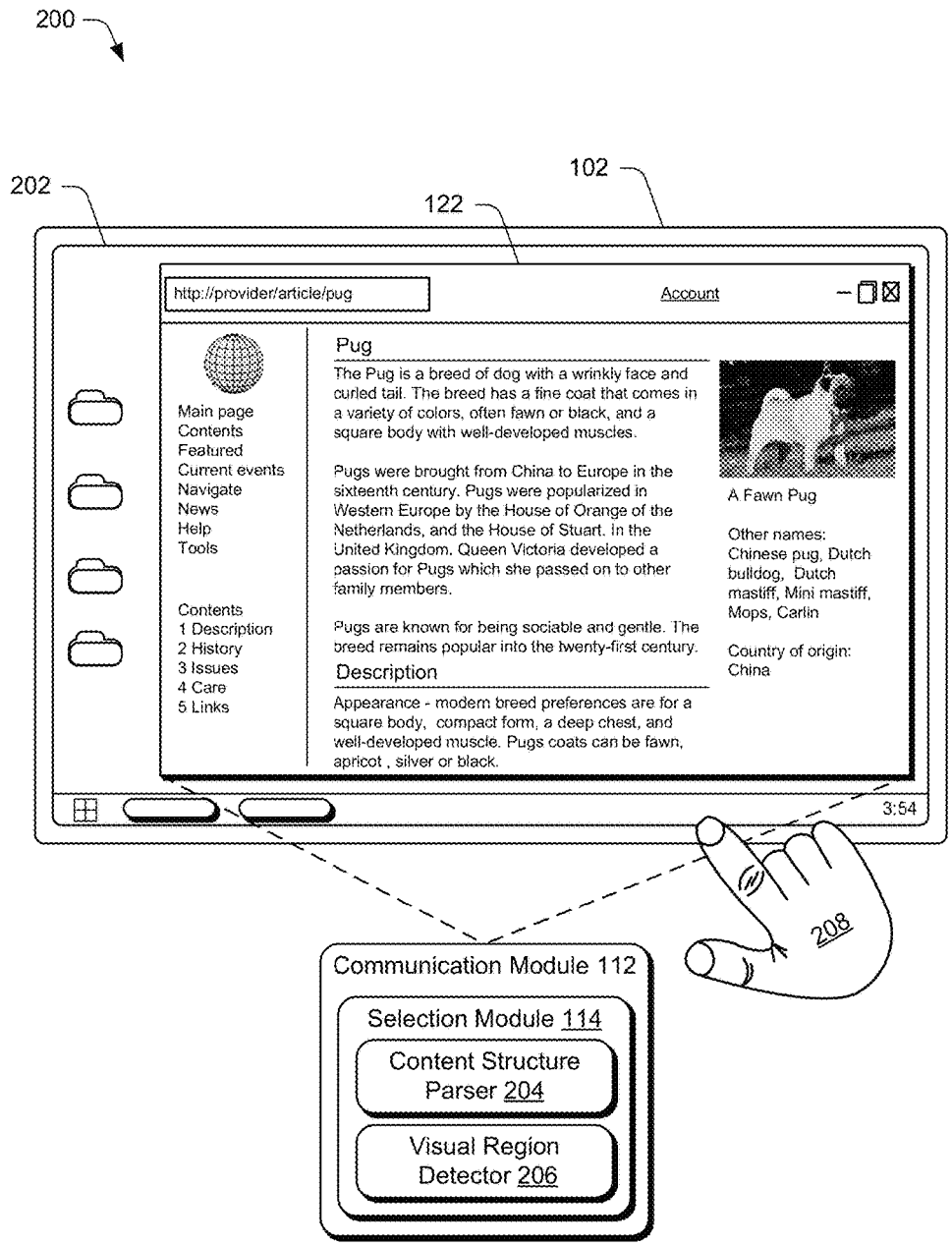
FIG. 2 illustrates an example configuration of a selection module in accordance with one or more implementations.

This section describes some example details and procedures for content selection in web documents in accordance with one or more implementations. In particular, FIG. 2 depicts generally at 200 an example configuration of a selection module in accordance with one or more implementations. In particular, a selection module 114 is represented as being a component of a communication module 112, such as a browser. Generally, the selection module 114 may be implemented as a software module, a hardware device, or using a combination of software, hardware, firmware, fixed logic circuitry, etc. The selection module 114 may be implemented as a standalone component of the computing device 102 as illustrated in FIG. 1. In addition or alternatively, the selection 114 may be configured as a component of the communication module 112 (as illustrated in FIG. 2), an operating system, or other device application. Further, the selection module 114 may be provided as a plug-in and/or downloadable script for a browser or other application 110. The selection module 114 may also represent script contained in or otherwise accessible via a webpage, web application, a web-based service, or other resources made available by a service provider 116.

In accordance with techniques described above and below, the selection module 114 includes a content structure parser 204 and a visual region detector 206 to facilitate content selections. As noted, the selection module 114 provides functionality to facilitate selections of content and refinement of the selections in connection with web content that is accessed and rendered via a communication module 112. Web content including pages and documents obtained via the communication module 112 are rendered and presented in views exposed by a user interface 122 of the communication module 112. In the example of FIG. 2, a representative user interface 122 formed by the communication module 112 is depicted as being presented via a display device 202 of a computing device 102. Here, the user interface 122 shows a webpage for an article on pugs that is accessed at a particular URL by a browser.

Note that the webpage includes various different regions and content items such as a side bar, title, image, introductory text, a description and so forth. The selection module 114 is designed to recognize multiple different regions in the page/content, configure the different regions as selectable portions, and expose the regions via the user interface 112 as individually selectable portions. In this context, the content structure parser 204 and a visual region detector 206 represent functionality for processing to analyze web content to identify different regions. In particular, the content structure parser 204 implements analysis of the underlying structure of the content (e.g., the mark-up code and DOM structure) to identify different discrete regions in the webpage. The content structure parser 204 examines code of the page to understand the page structure via the different elements, tags, portions, content types, sections, links, page hierarchy, and so forth defined in the code. The content structure parser 204 detects and/or defines different regions based on this analysis. The content structure parser 204 may operate independently or in combination with a visual region detector 206 as described below.

The visual region detector 206 provides another mechanism to detect and/or define different regions based on optical recognition techniques. The visual region detector 206 implements visual analysis of web content as it appears when rendered. Different discrete regions are detected based on the visual analysis of the appearance. The visual region detector 206 examines various aspects of the appearance, such as element position, alignment, text sizes, spacing and padding, frames, panes, borders and other visual features of the content. Visual region detector 206 detects and/or defines different regions based on this analysis. The visual region detector 206 may be employed in combination with the content structure parser 204 to recognize regions. The visual region detector 206 may also be employed independently to perform region detection. By way of example and not limitation, the visual region detector 206 may be invoked to process images, scanned documents, and other content items that contain little or no associated structure that would be detectable via the content structure parser 204.

Generally, the selection module 114 detects, processes, refines, and represents content selections within a view of web content responsive to interaction 208 with the web content in various ways. Various types of interaction 208 and input mechanisms may be employed in connection with the selection techniques described herein. By way of example and not limitation, interaction 208 in the form of touch input from a finger of a user is represented in the example of FIG. 2. The touch input may be recognized via a digitizer integrated with the display device 202. Various other kinds of input mechanisms representing different functionalities for providing corresponding input to the computing device 102 are also contemplated. Examples of the input mechanisms include, but are not limited to, gesture-sensitive sensors and devices (e.g., such as touch-based sensors and movement-tracking sensors (e.g., camera-based)) to recognize gestures, single or multiple finger touches, a mouse for cursor input, a keyboard used to provide key commands, keystrokes, and shortcut, input associated with a stylus or pen, a touch pad, accelerometers, a microphone with accompanying voice recognition software for voice commands, and so forth. These and other different types of input may be formed via different input mechanisms to define a selection and refine the selection in the mariner described herein.

In this context, consider further details discussed in relation to the following example procedures, user interface, and scenarios. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 3:
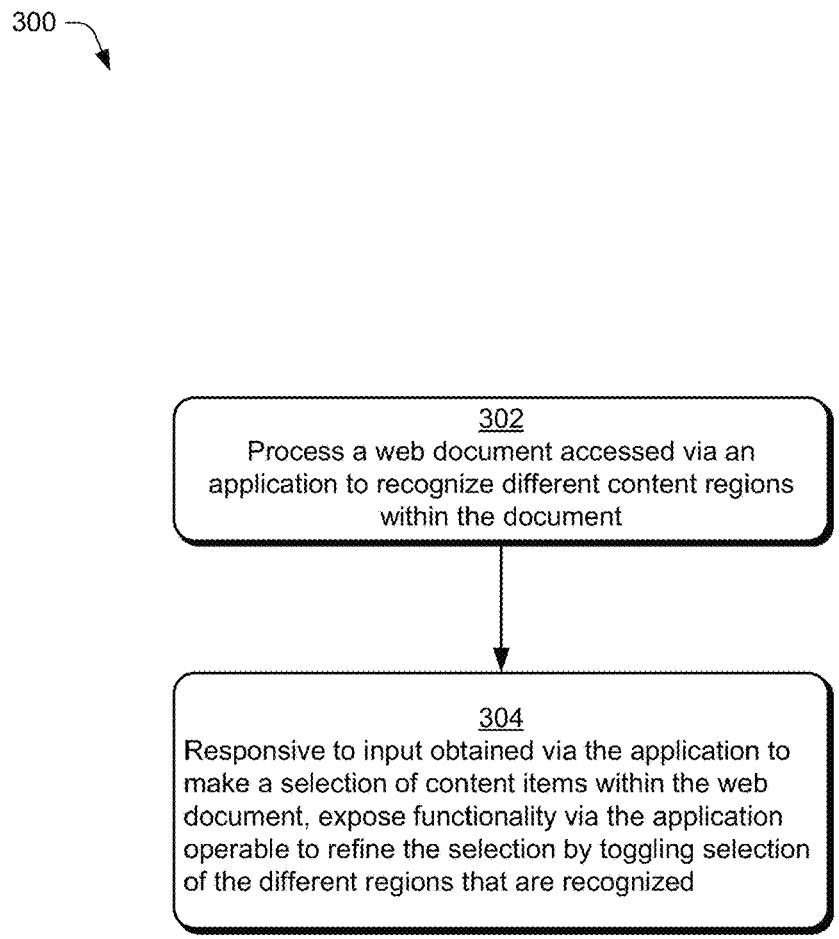
FIG. 3 is a flow diagram depicting an example procedure for selection refinement in accordance with one or more implementations.

FIG. 3 is a flow diagram depicting an example procedure 300 for selection refinement in accordance with one or more implementations. A web document accessed via an application is processed to recognize different content regions within the document (block 302) and responsive to input obtained via the application to make a selection of content items within the web document, functionality is exposed via the application operable to refine the selection by toggling selection of the different regions that are recognized (block 304). For example, a selection module 114 as previously discussed may be implemented via a communication module 112, such as a browser. The selection module 114 operates to process web content including pages and document accessed via the communication module 112 to recognize different content regions included in the web content. As noted, this may include analysis of code associated with the content and/or visual analysis of the page using optical recognition techniques. Recognized content regions are configured as selectable regions within a view of the content presented via the communication module 112. It is noted that processing to find content regions may be initiated in various ways. In one approach, processing for region recognition is performed in at the time a page is being loaded and accordingly the regions are pre-established for a presented view. In another approach, a selection command such as a keystroke or command to "select-all," or a selection of a portion of content using a mouse or stylus initiates the processing to detect regions within corresponding content. Still further, the region analysis may be performed via a service provider upon resources provided by the service provider. In this case, regions may be pre-defined within pages and documents accessed from the service provider and indication regarding the regions may be embedded within corresponding code for the pages and documents.

Once regions have been established, the regions may be employed in various ways to facilitate content selections and refinements. Various functionality is exposed via the application to represent the regions and enable interaction with the regions in connection with making and refining selection of content. For example, representations of the different regions may be presented via a view of the context rendered in a user interface 122 of the communication module 112. Representations may be configured in various ways, examples of which include showing borders, using shading, highlighting regions, or otherwise visually representing different regions in the view. Additionally, regions may be exposed in the user interface along with controls and other functionality operable to refine a selection. The refinement controls/functionality may enable a user to select or deselect individual regions of the content, such as by using checkboxes or other toggle controls to expand/contract a selection to encompass different content portions using controls, keystrokes or other inputs. Various types of functionality and controls operable to refine the selection by toggling selection of the different regions that are recognized are contemplated including selectable buttons, toggle controls, check-boxes, slider controls, assignments of regions to different hardware keys of a mouse, keyboard or other input device, displaying icons, assigning gesture for toggle control, and so forth. In implementations, regions and corresponding controls are exposed in response to input provided to make a selection of content items. The input may be a select all command (e.g., ctrl+a), selections using a mouse or stylus, touch-based selection, or other input suitable to specify selected content items.

Figure 4:
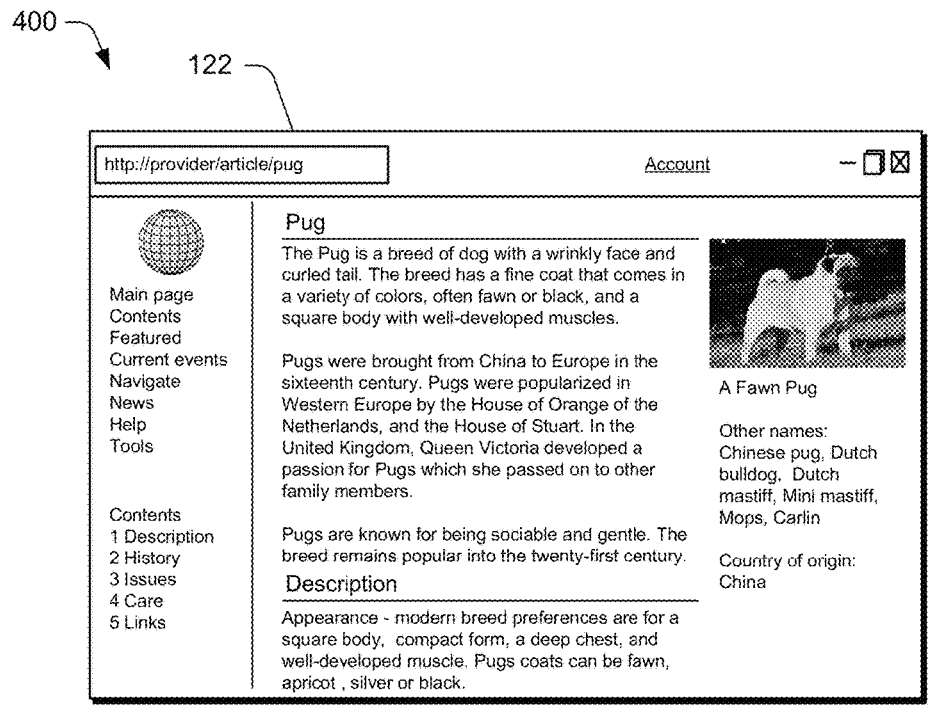
FIG. 4 illustrates an example selection of scenario in accordance with one or more implementations.
Figure 4:
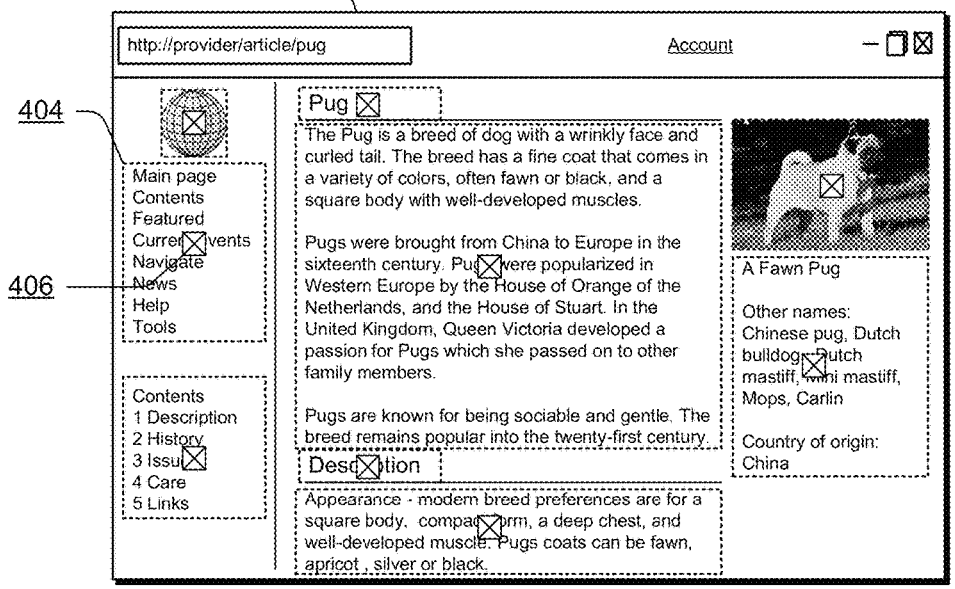

To further illustrate, consider FIG. 4 which depicts generally at 400 an example selection scenario in accordance with one or more implementations. As represented in view "A", a webpage output via a user interface 122 is rendered without demarcation of different regions prior to selection of content within the webpage. Selection input 402 is then obtained. The selection input 402 represents interaction that may occur (e.g., interaction 208) in various ways to select at least some content items within the page. In the particular example, the selection input 402 is represented as a select all command that causes a selection of all of the page content. Of course, selection input 402 may alternatively specify selected content items using a mouse or stylus, touch-based selection, or other suitable input, and the selection may encompass all content or just a portion of the page content.

Responsive to the selection input 402, the webpage output via the user interface 122 is updated as represented in view "B" to show different regions within the page along with controls operable to refine the selection. Various different representations of the regions and controls are contemplated. In particular, the example of FIG. 4 depicts each of the regions as being shown with a border 404 to define the different regions. The regions correspond to different content portions such as a titles, text sections, menus, images of the example article. The regions that are represented may be detected "on-demand" responsive to the selection input 402 or in advance when the page is loaded or on the server-side as noted previously. In this example, the border is configured as a dashed line. Other techniques to represent different regions are also contemplated, such as by using different types of borders, coloring, highlighting and/or other effects.

Additionally, each of the regions is shown as being associated with a refinement control 404. The refinements controls 404 represent selectable elements associated with regions that provide indications regarding which of the regions are selected and enable toggling of the selection with respect to the regions. In this example, the refinements controls 404 are configured as checkboxes that represent selected regions with an "x" inside a box element. The checkboxes are selectable on an individual basis to toggle selection of a corresponding region on and off. Other types of refinements controls 404 operable to facilitate selection/deselection of the regions are also contemplated including icons, buttons, arrows, use of the border 404 as a refinement control, and so forth.

In the case of selection input 402 in the form of a select all command, all or the regions are initially selected as depicted on FIG. 4. On the other hand, if selection input 402 is directed to a sub-set of the regions or particular items of content, then the selected sub-set and items are represented as being selected and other content is represented as being deselected. In either case, refinement controls 404 are provided to enable refinement of the selection by toggling the selection and deselection of individual regions.

Figure 5:
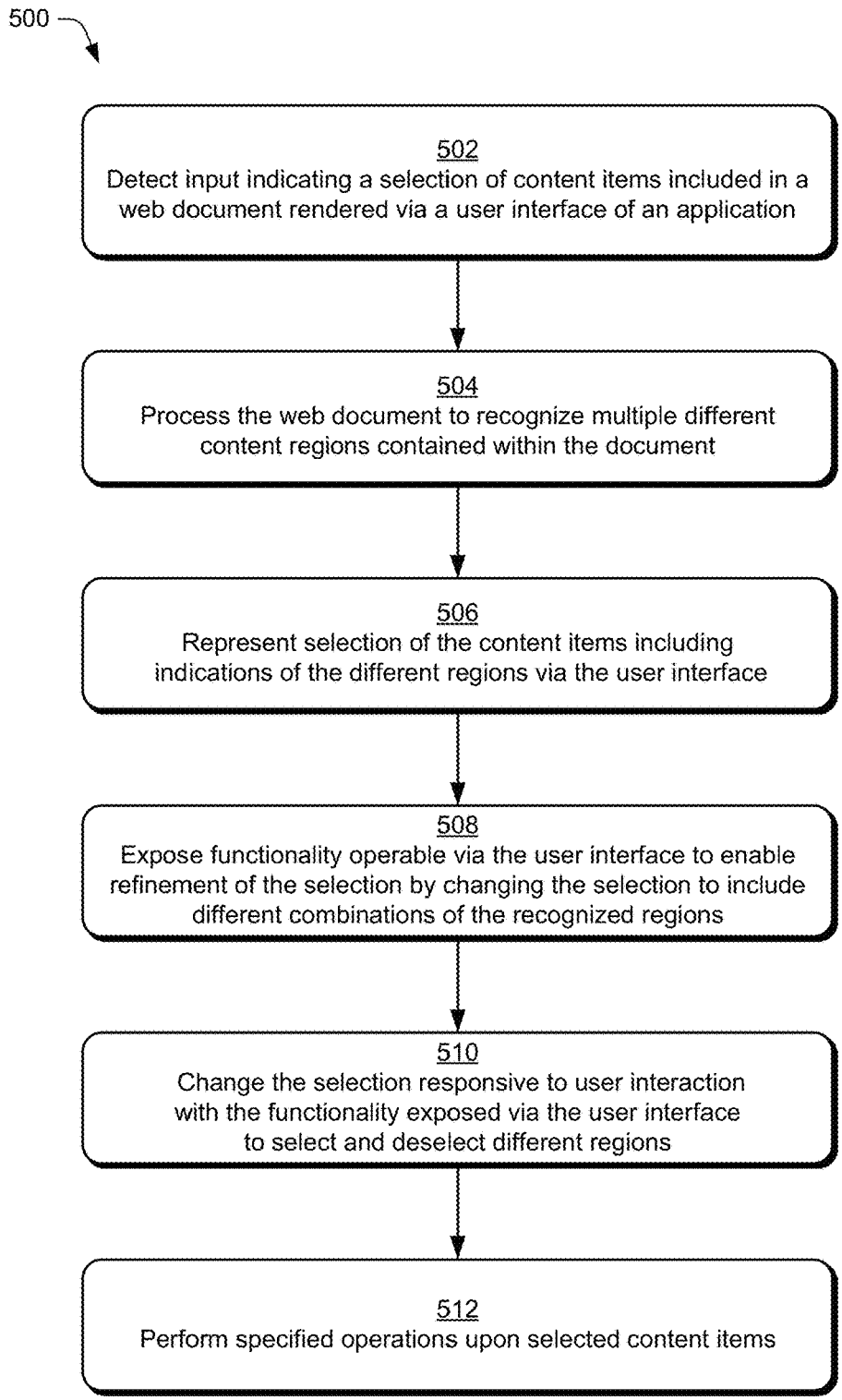
FIG. 5 is a flow diagram depicting an example procedure for refinement of a selection by changing the selection to include different combinations of selectable regions in accordance with one or more implementations.

FIG. 5 is a flow diagram depicting an example procedure 500 for refinement of a selection by changing the selection to include different combinations of selectable regions in accordance with one or more implementations. Input is detected that indicates a selection of content items included in a web document rendered via a user interface of an application (block 502). Various types of interaction and input to define a selection are contemplated, some examples of which are described above and below. The web document is processed to recognize multiple different content regions contained within the document (block 504). In implementations, the processing occurs responsive to the selection input. Processing to recognize regions mat also occur in advance as noted previously. In this case, the multiple different content regions to represent in relation to the selection input are identified by referencing indications of the "pre-established" regions contained in the document.

Then, selection of the content items is represented including indications of the different regions via the user interface (block 506), and functionality is exposed via the user interface operable to enable refinement of the selection by changing the selection to include different combinations of the recognized regions (block 508). For example +, selected items may be represented using borders, shading, and color, and/or visual effect as mentioned in the discussion of FIGS. 3 and 4. Additionally, various functionality to indicate and refine the selection of content items may be provided. The functionality may include refinement controls that are associated with different detected regions as noted above. Functionality may also include selectable icons or elements exposed in the interface, key commands, a pop-up control bar, selectable links, or menu items that enable cycling the selection through different regions to expand the selection to more regions and/or reduce the selection to fewer regions.

The selection is changed responsive to user interaction with the functionality exposed via the user interface to select and deselect different regions (block 510). In particular, different regions are selected and deselected in accordance with user input obtained via the user interface. The input may be supplied through interaction with refinements controls 404 such as checkboxes, icons, and other UI instrumentalities. Input may also be supplied through different input mechanisms such as gestures, defined keystrokes, voice commands, and so forth. Then, specified operations are performed upon selected content items (block 512). A wide range of operations may be applied to content that is selected using the techniques described herein. For example, a user may copy/paste, save, share, apply formatting, or otherwise utilize selected portions of content. In accordance with techniques described herein, designated operations are applied to regions and corresponding content that is selected in the mariner described herein.

Figure 6:
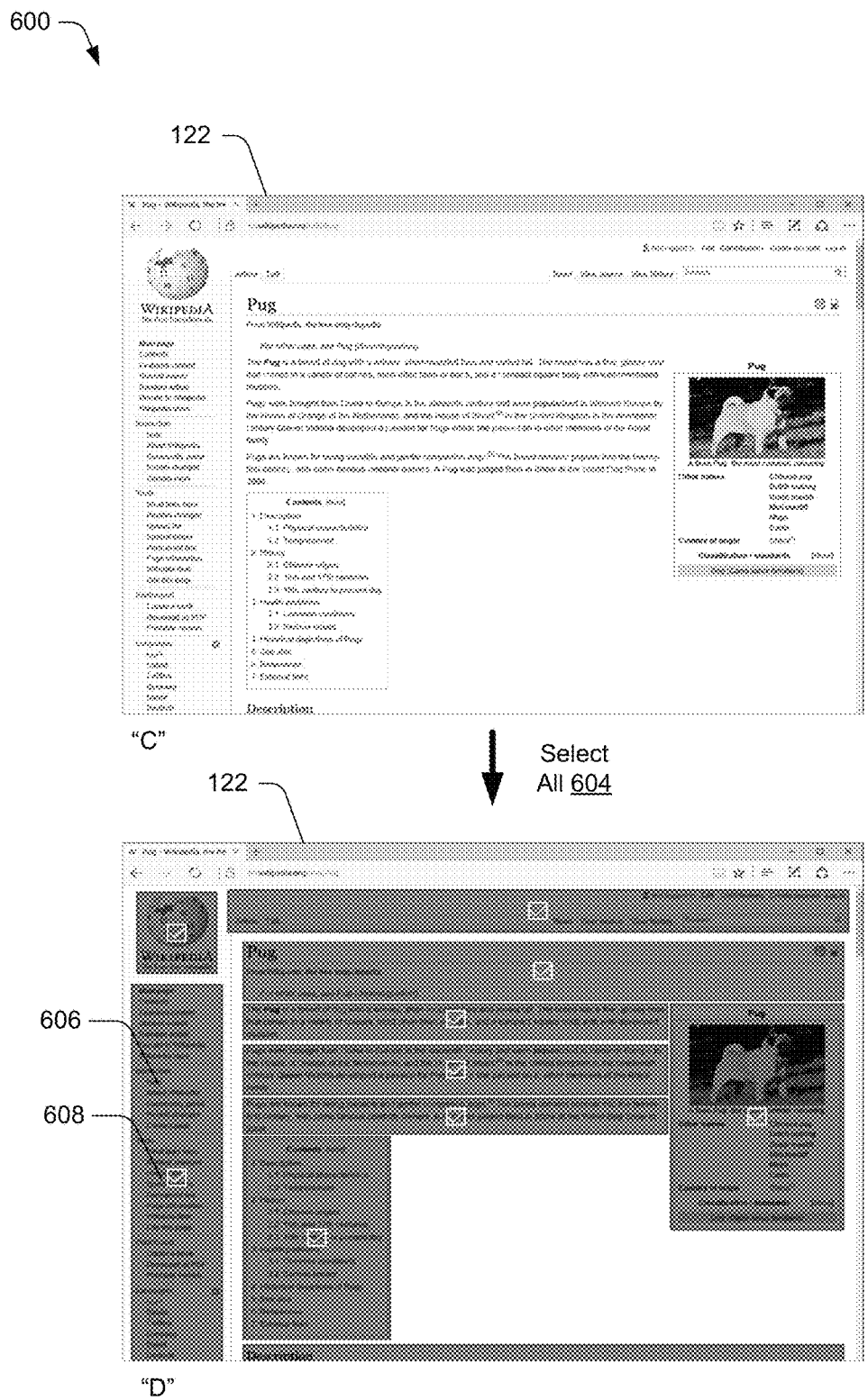
FIG. 6 illustrates an example selection scenario in which a select all operation causes display of selectable regions in accordance with one or more implementations.

Further examples, details, and scenarios illustrating aspects of the techniques for content selection in web documents are discussed in relation to FIGS. 6 to 13. FIG. 6 illustrates generally at 600 an example selection scenario in which a select all operation causes display of selectable regions in accordance with one or more implementations. In this example, view "C" depicts a webpage rendered via a user interface 122 without demarcation of different regions prior to selection of content within the webpage. Input to cause a select all 604 operation is obtained using various techniques examples of which were previously discussed. View "D" is exposed responsive to the select all 604 operation. Here, different regions 606 identified in the webpage via techniques described herein are demarcated. In this case, the regions are represented using borders or bounding boxes. Additionally, the regions are highlighted or shaded to represent selection of all of the regions in response to the select all 604 operation. The regions are additionally associated with refinement controls 608 operable to refine the selection. In this example, the refinement controls 608 are configured as checkboxes that enable selection and deselection of regions on an individual basis.

Figure 7:
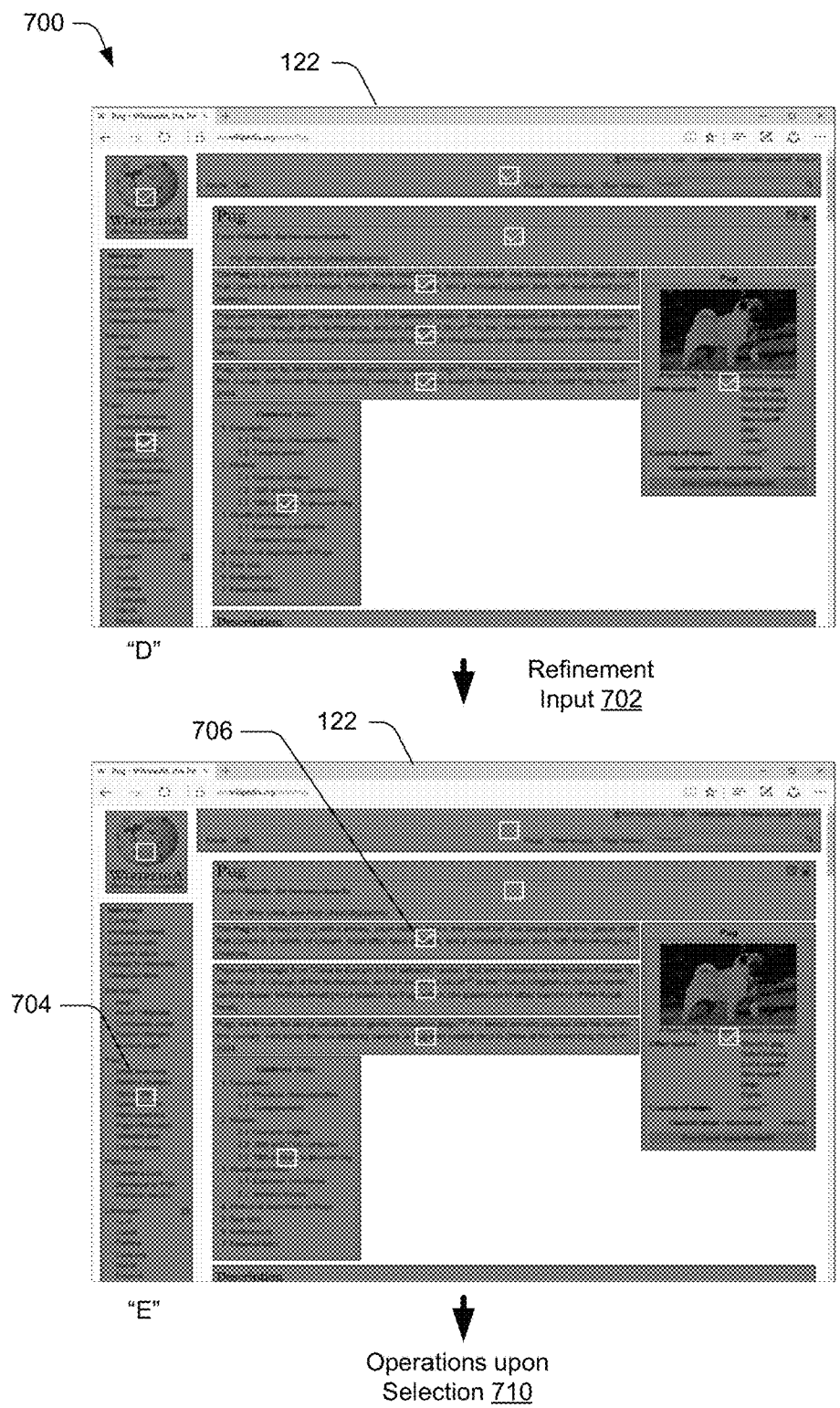
FIG. 7 illustrates an example scenario for selection refinement using by toggling selectable regions in accordance with one or more implementations.

In the context of the example of FIG. 6, FIG. 7 illustrates generally at 700 an example scenario for selection refinement by toggling selectable regions in accordance with one or more implementations. In particular, the scenario represented in FIG. 7 shows view "D" following the select all 604 operation as discussed in relation to FIG. 6. Now, assume input to modify the selection is obtained via refinement controls provided via the user interface. In particular, refinement input 702 may be obtained to toggle selection of selectable regions presented in view "D". Here, a user can select regions using checkboxes associated with each region. The result of refinement input 702 to make individual region selections is represented in view "E". Here, the view includes some regions that are deselected 704 and some regions that are selected 706 using the checkboxes. Once the selection is set, various operations upon the selection 710 may be specified, such as copy/paste, save, share, apply formatting, or otherwise utilizing selected portions of content.

Figure 8:
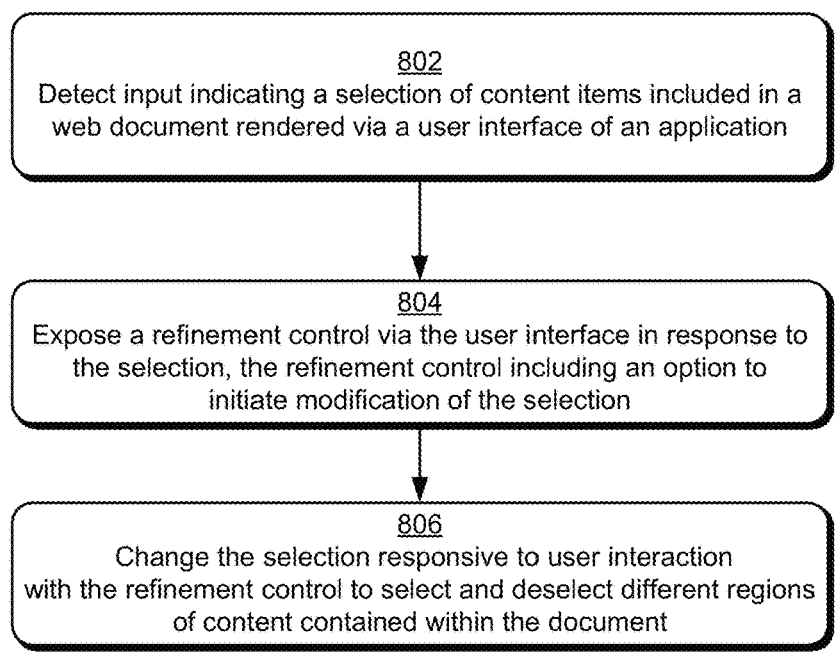
FIG. 8 is a flow diagram depicting an example procedure for refinement of a selection using a refinement control(s) in accordance with one or more implementations.

FIG. 8 is a flow diagram depicting an example procedure 800 for refinement of a selection using a refinement control(s) in accordance with one or more implementations. Input is detected indicating a selection of content items included in a web document rendered via a user interface of an application (block 802). Various types of input to initiate a selection are contemplated including but not limited to input via a mouse, stylus (e.g., click and drag) or other input device; touch input; a gesture, and so forth. The input may define a selection of particular content items such as a portion of text, an image frame, a particular region, and so on. Here, the selection may be directed to one or more individual content items, or alternatively could be a select all command as previously noted.

A refinement control is exposed via the user interface in response to the selection, the refinement control including an option to initiate modification of the selection (block 804). Then, the selection is changed responsive to user interaction with the refinement control to select and deselect different regions of content contained within the document (block 806). As noted, refinement controls may be configured in various ways. For instance, refinement controls may include icons or elements exposed in the interface, key commands, a pop-up control bar, selectable links, or menu items that enable cycling the selection through different regions to expand the selection to more regions and/or reduce the selection to fewer regions. Refinement controls enable modification of a selection in various ways. For example, controls can enable selection of regions on an individual basis, cycling through different combination of items for a selection, expansion/contraction of an initial selection, and so forth. The initial selection is modified in accordance with input obtained using one or more refinement controls provided to facilitate the modification.

Figure 9:
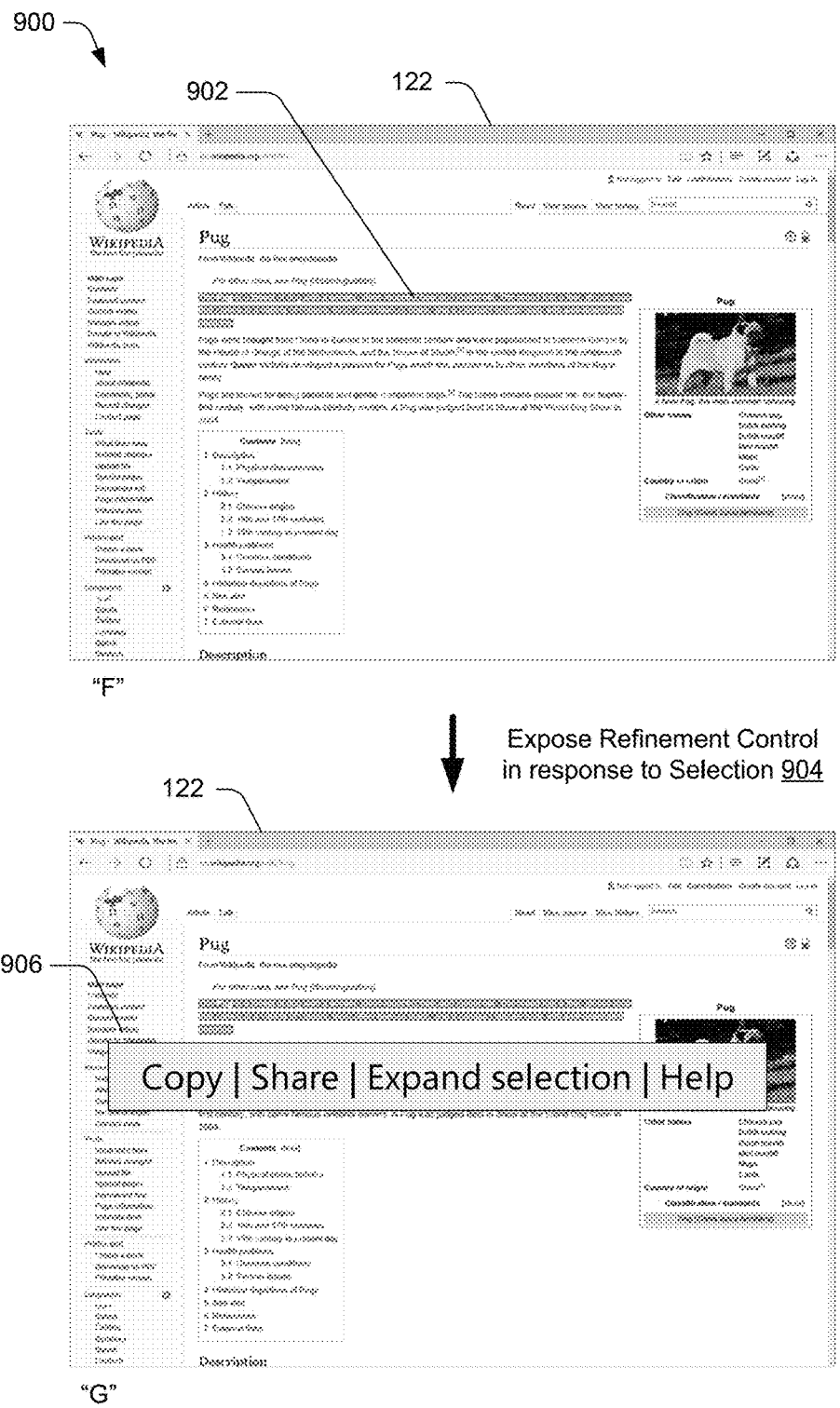
FIG. 9 illustrates an example selection scenario in which a refinement tool is provided accordance with one or more implementations.
Figure 10:
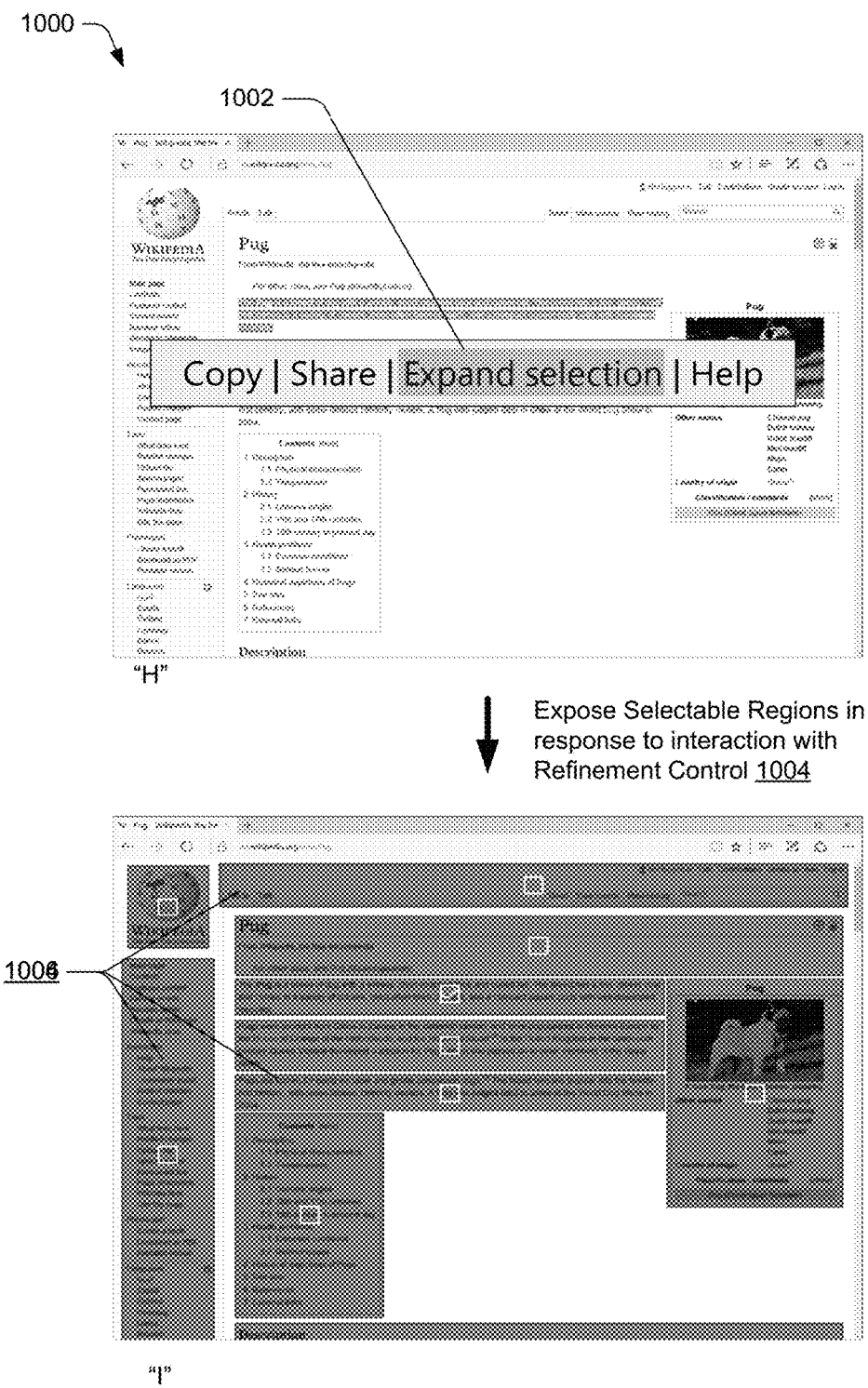
FIG. 10 illustrates an example selection scenario involving interaction with a refinement tool in accordance with one or more implementations.
Figure 11:
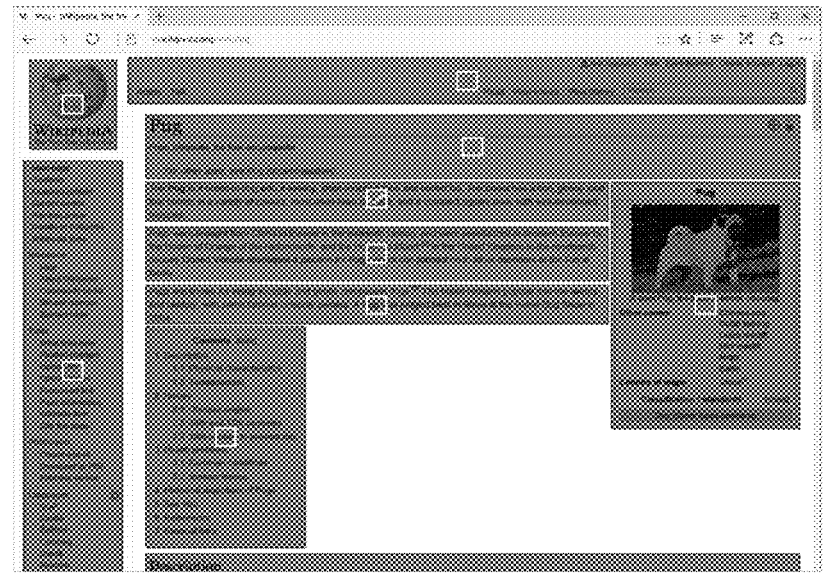
FIG. 11 illustrates an example refinement of a selection in accordance with one or more implementations.
Figure 11:
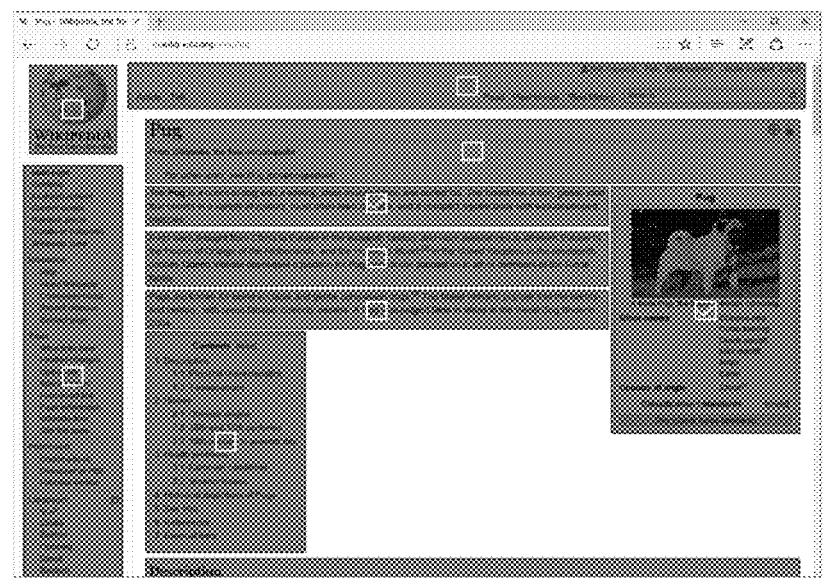

Consider now an illustrative example of selection refinement through selection of regions on an individual basis as described in relation to FIGS. 9 to 11. FIG. 9 illustrates generally at 900 an example selection scenario in which a refinement tool is provided accordance with one or more implementations. View "F" in FIG. 9 depicts a webpage rendered via a user interface 122 showing an initial selection 902 of content within the webpage. Initial selection 902 in this case is a selection of one particular paragraph of the article shown in the webpage. As discussed, the initial selection 902 may trigger operations to expose refinement controls in response to selection as represented at 904. In the depicted example, view "G" illustrates a refinement control 906 that is rendered responsive to the initial selection 902. The refinement control 906 is configured as a pop-up menu element that provide options related to the selected content. In particular, the refinement control 906 is represented as a pop-up bar having options to copy, share, or expand (e.g., modify) the selection, and to access help.

Operation of the refinement control is represented in relation to FIG. 10. In particular, FIG. 10 illustrates generally at 1000 an example selection scenario involving interaction with a refinement tool in accordance with one or more implementations. View "H" represents interaction 1002 with the refinement control 906 to select the expand selection option. Interaction may be obtained via touch input, a stylus, keystrokes, voice commands, and so forth. Responsive to the interaction, operations are initiated to expose selectable regions in response to the interaction as represented at 1004. In the depicted example, view "I" illustrates the example webpage with different regions 1006 identified in the webpage via techniques described herein being demarcated. In this case, the regions are once again represented using borders or bounding boxes along with checkboxes that enable selection and deselection of regions on an individual basis. In this case, the content associated with the initial selection 902 is represented as being selected and other regions are represented as being deselected.

Continuing the ongoing example, selection refinement is represented in relation to FIG. 11. In particular, FIG. 11 illustrates generally at 1100 an example refinement of a selection in accordance with one or more implementations. Here, the scenario represented in FIG. 11 shows view "I" following interaction 1002 as discussed in relation to FIG. 10. Again, assume input to modify the selection is obtained via the refinement controls (e.g., checkboxes) provided with the selectable regions via the user interface. In particular, refinement input 1102 may be obtained to toggle selection of one or more selectable regions presented in view "I". In the depicted example, a user selects the region associated with the pug image in addition to content associated with the initial selection 902. The result of refinement input 1102 is represented in view "J". Once the selection is set, various operations upon the selection 1104 may be specified, such as copy/paste, save, share, apply formatting, or otherwise utilizing selected portions of content.

Figure 12:
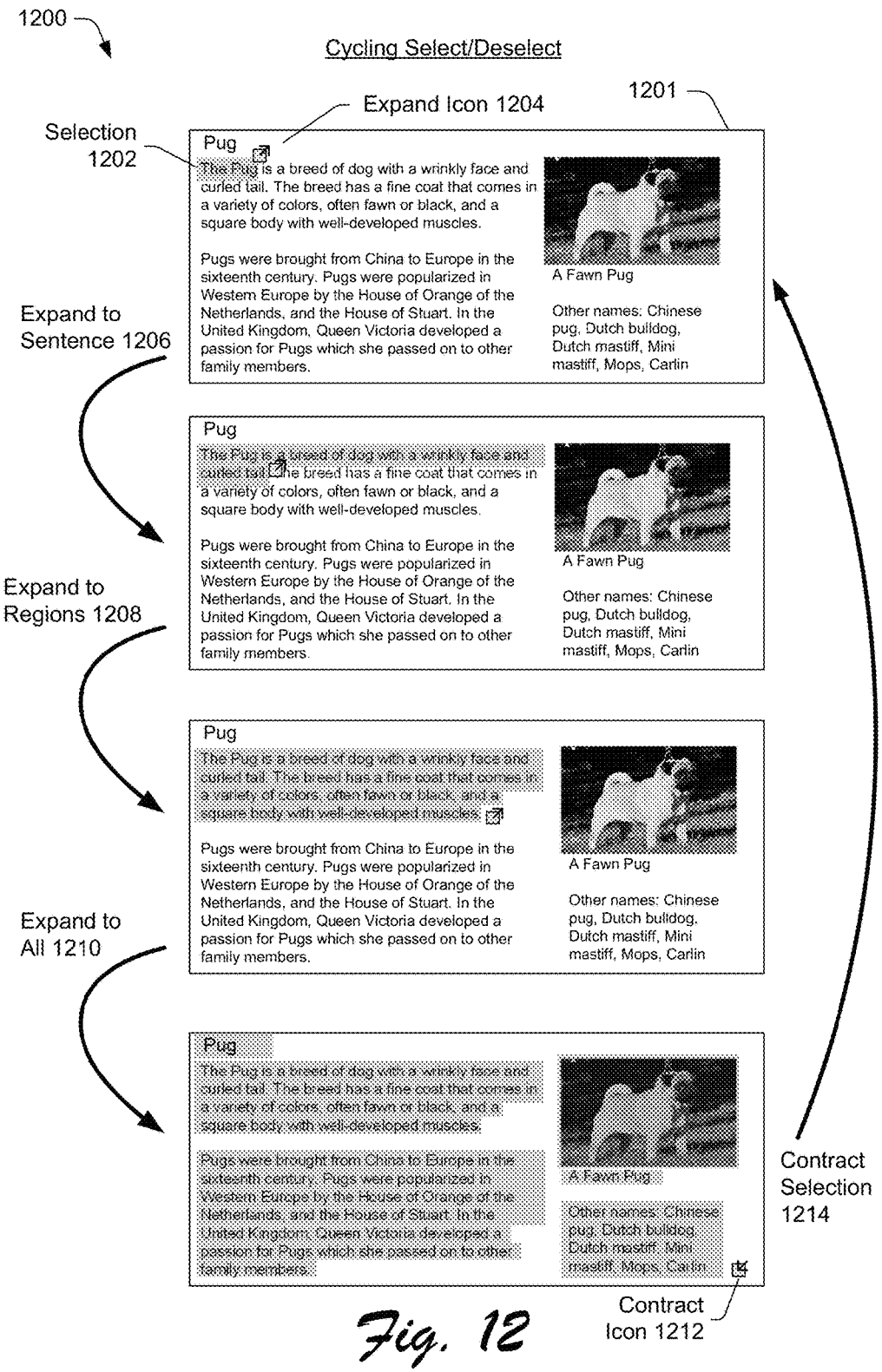
FIG. 12 illustrates an example selection cycling scenario in accordance with one or more implementations.

As noted, refinement controls may also be configured to facilitate selection of regions by cycling through different combinations of items for a selection and/or expansion/contraction of an initial selection using appropriate controls. Illustrative examples are described in relation to FIGS. 12 to 13. In particular, FIG. 12 illustrates generally at 1200 an example selection cycling scenario in accordance with one or more implementations. A portion 1201 of a webpage is represented in a succession of views that represent cycling of an initial selection 1202 using a refinement control. In particular, FIG. 12 represents and expand icon 1204 that may be exposed as a refinement control responsive to the initial selection 1202. The expand icon 1204 provides a visual indication to a user that the selection is expandable via the icon. Selecting the expand icon causes the initial selection 1202 to expand and encompass additional content. The expansion may occur according to a defined hierarchy of levels such as a hierarchy with different levels for word, line, paragraph, sentence, region, frames, etc. The expansion may also be based on the page layout using element identifiers, z-order of elements, or other characteristics to control modification of the selection.

As represent, repeated selection of the example expand icon 1204 causes the initial selection 1202 of a phrase to expand to sentence 1206, expand to regions 1208, and expand to all 1210. At this point, continued cycling may cause the selection to contract (since all content is currently selected). Accordingly, functionality of the icon shown by the selection switches to enable contraction. Optionally, the expand icon 1204 may visually transition to a contract icon 1212 as represented in FIG. 12. The contract icon 1212 is operable to contract the selection back to the original state as represented at 1214, or back down to a selection of fewer items.

In this case, the refinement controls enable cycling through different combinations of regions and content items. Although cycling in one direction is depicted, it is noted that refinement controls may be configured to enable cycling in both directions (e.g., expand or contract). For example, both the expand icon 1204 and the contract icon 1212 may be exposed at appropriate stages or different types of interaction may be defined (e.g., 1-click expand and 2-click contract) to enable modification of the selection bi-directionally. Other controls may also be used, such as showing arrow icon elements, defining particular keyboard shortcuts, or designating mouse buttons or keys (e.g., up/down arrows) to drive modification of the selection.

Figure 13:
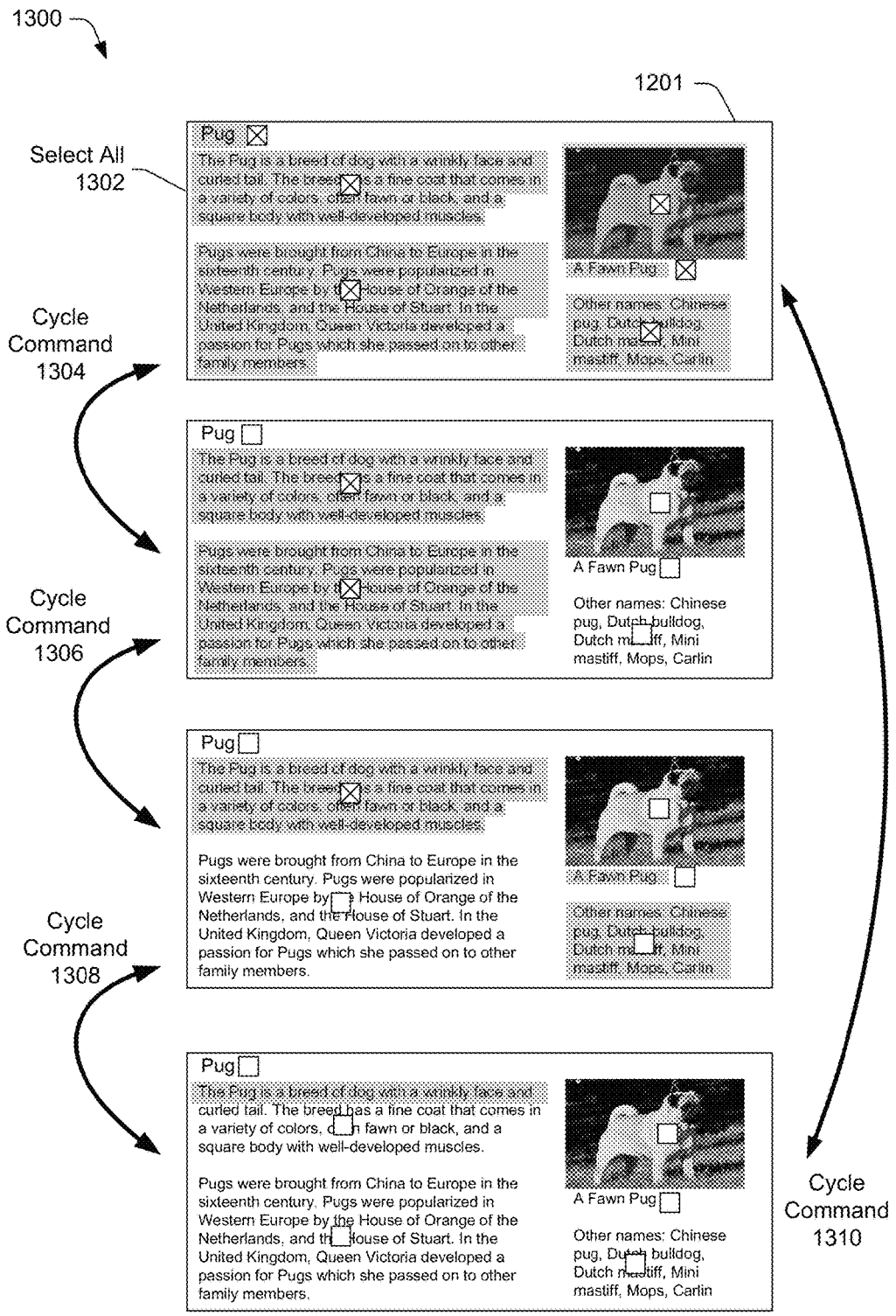
FIG. 13 illustrates an example selection cycling scenario in accordance with one or more implementations.

FIG. 13 illustrates generally at 1300 another example selection cycling scenario in accordance with one or more implementations. The example is similar to the example of FIG. 12 except in this case the process begins with a select all 1302 command to select all content and cycling occurs through cycle commands 1304, 1306, 1308, 1310 instead of using icons or other controls exposed in the user interface. As represented, the cycle commands enable expansion and contraction of the initial selection by cycling through different combinations of regions recognize in the webpage. Cycling may occur in both directions. An example of a cycle command is a keyboard shortcut such as "ctrl+a" to select-all content initially and then cycle through options as represented in FIG. 13 as the shortcut is repeated. Different keys or shortcuts may be associated with cycling in different directions. For example, an up arrow key may be used to cycle in one direction and a down arrow key may be used to cycle in the opposite direction. Cycle commands may also include designated gestures or voice commands. Various different techniques, controls, and commands for content selection described herein may be used individually or in different combinations. For example, the cycle commands described in relation to FIG. 13 may be available in addition to other refinement controls such as checkboxes, a pop-up menu, voice commands, and so forth.

Having considered the foregoing example details and procedures in accordance with one or more implementations, consider now a discussion of example systems and devices that can be utilized to implement the various techniques described herein.

Example System and Device

Figure 14:
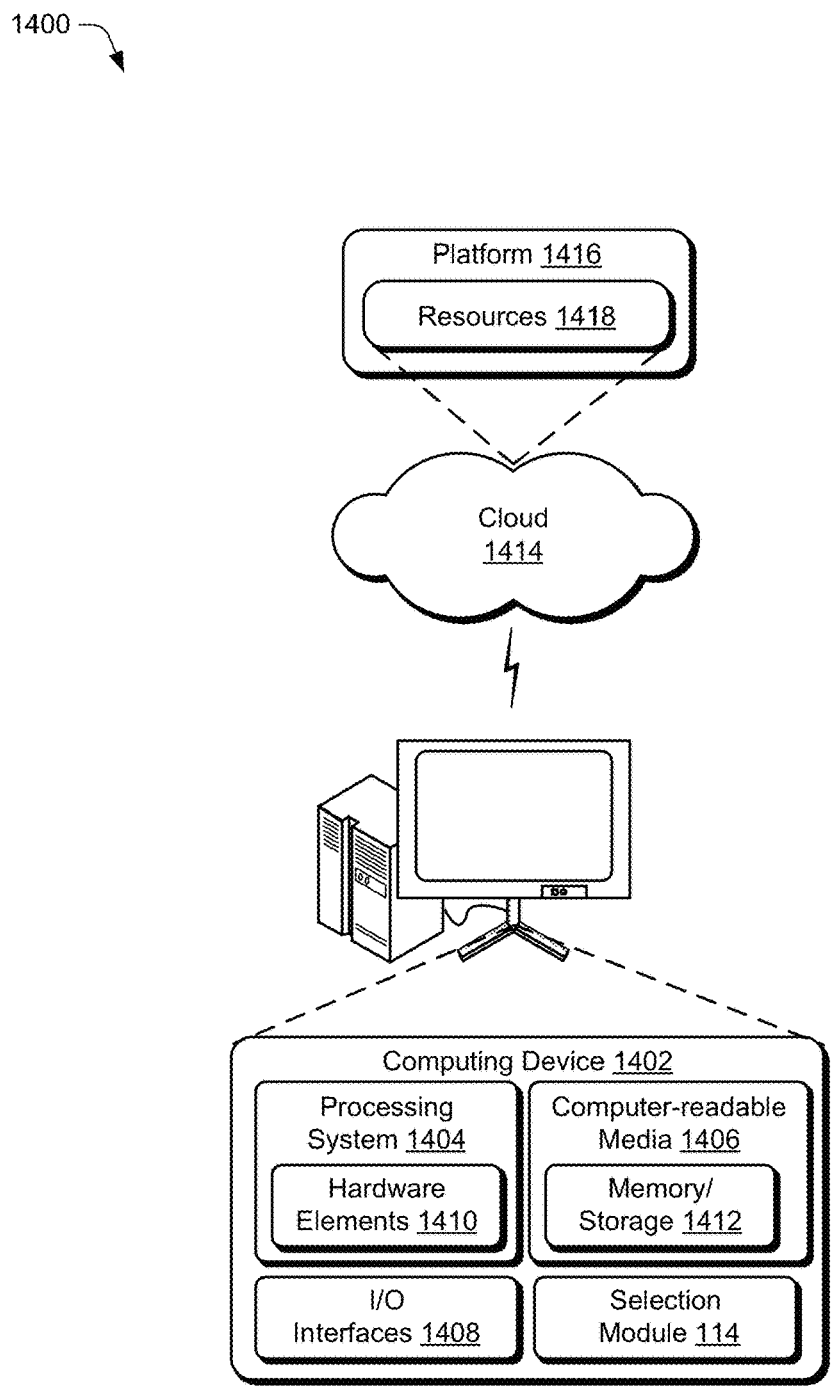
FIG. 14 illustrates an example system including various components of an example device that can be employed for one or more implementations described herein.

FIG. 14 illustrates an example system generally at 1400 that includes an example computing device 1402 that is representative of one or more computing systems and/or devices that may implement the various techniques described herein. This is illustrated through inclusion of the selection module 114, which operates as described above. The computing device 1402 may be, for example, a server of a service provider, a device associated with a client (e.g., a client device), an on-chip system, and/or any other suitable computing device or computing system.

The example computing device 1402 is illustrated as including a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

EXAMPLE IMPLEMENTATIONS

Example implementations of techniques described herein include, but are not limited to, one or any combinations of one or more of the following examples:

Example 1

A method implemented by a computing device, the method comprising: detecting input indicating a selection of content items included in a web document rendered via a user interface of an application; processing the web document to recognize multiple different content regions contained within the document; representing selection of the content items including indications of the different content regions via the user interface; and exposing functionality operable via the user interface to enable refinement of the selection by changing the selection to include different combinations of the recognized regions.

Example 2

The method of example 1, further comprising changing the selection responsive to user interaction with the functionality exposed via the user interface to select and deselect different regions.

Example 3

The method of example 1, further comprising performing specified operations upon selected content items.

Example 4

The method of example 1, wherein the application comprises a web browser.

Example 5

The method of example 1, wherein the input indicating a selection of content items comprises a select all command.

Example 6

The method of example 1, wherein indications of the different content regions include borders placed around each of the regions.

Example 7

The method of example 1, wherein the functionality operable via the user interface to enable refinement of the selection includes toggle controls associated with each of the content regions.

Example 8

The method of example 1, wherein the functionality operable via the user interface to enable refinement of the selection includes a control element operable to enable cycling through different combinations of the content regions for inclusion in the selection.

Example 9

The method of example 1, wherein processing the web document to recognize multiple different content regions includes parsing the underlying structure of the web document to identify different discrete regions in the web document.

Example 10

The method of example 1, wherein processing the web document to recognize multiple different content regions includes visually analyzing the web document as it appears when rendered to detect different discrete regions based on the visual analysis.

Example 11

The method of example 1, wherein recognized content regions are configured as portions of the content that are individually selectable.

Example 12

The method of example 1, wherein the input indicating the selection of content items is detected via input mechanisms associated with the computing device including one or more of gesture-sensitive sensors and devices for gesture detection, touch input, keyboard input and commands, mouse input, stylus input, or a microphone for voice commands.

Example 13

One or more computer-readable storage media comprising instructions stored thereon that, responsive to execution by a computing device, cause the computing device to implement a selection module configured to perform operations including: detecting input indicating a selection of content items included in a web document rendered via a user interface of an application; exposing a refinement control via the user interface in response to the selection, the refinement control including an option to initiate modification of the selection; and changing the selection responsive to user interaction with the refinement control to select and deselect different regions of content contained within the document.

Example 14

One or more computer-readable storage media as recited in example 13, further comprising processing the web document responsive to detection of the input to recognize the content regions and configuring the recognized regions as portions of the content that are individually selectable.

Example 15

One or more computer-readable storage media as recited in example 13, wherein the refinement control comprises a pop-up menu element including options available for the selected content items.

Example 16

One or more computer-readable storage media as recited in example 13, wherein the refinement control comprises an icon selectable to expand and contract the selection by cycling through different options for the selection corresponding to different combinations of the different regions.

Example 17

A computing device comprising: a processing system; one or more computer readable media storing instructions executable via the processing system to perform operations comprising: processing a web document accessed via an application to recognize different content regions within the document; and responsive to input obtained via the application to make a selection of content items within the web document, exposing functionality via the application operable to refine the selection by toggling selection of the different regions that are recognized.

Example 18

The computing device of example 17, wherein processing of the web document occurs on-demand in response to the input obtained via the application to make the selection.

Example 19

The computing device of example 17, wherein processing of the web document occurs when the web document is loaded by the application.

Example 20

The computing device of example 17, wherein the processing of the web document includes: parsing the underlying structure of the web document to identify different discrete regions in the web document; and visually analyzing the web document as it appears when rendered to detect different discrete regions based on the visual analysis.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a computing device, the method comprising:
  detecting input indicating a selection of content items included in a web document rendered via a user interface of an application;
  processing the web document to recognize multiple different content regions contained within the document;
  representing selection of the content items including indications of the different content regions via the user interface; and
  exposing functionality operable via the user interface to enable refinement of the selection by changing the selection to include different combinations of the recognized regions, wherein the functionality includes a control element operable to enable cycling through different combinations of the content regions for inclusion in the selection.

2. The method of claim 1, further comprising changing the selection responsive to user interaction with the functionality exposed via the user interface to select and deselect different regions.

3. The method of claim 1, further comprising performing specified operations upon selected content items.

4. The method of claim 1, wherein the application comprises a web browser.

5. The method of claim 1, wherein the input indicating a selection of content items comprises a select all command.

6. The method of claim 1, wherein indications of the different content regions include borders placed around each of the regions.

7. The method of claim 1, wherein the functionality operable via the user interface to enable refinement of the selection includes toggle controls associated with each of the content regions.

8. The method of claim 1, wherein processing the web document to recognize multiple different content regions includes parsing the underlying structure of the web document to identify different discrete regions in the web document.

9. The method of claim 1, wherein processing the web document to recognize multiple different content regions includes visually analyzing the web document as it appears when rendered to detect different discrete regions based on the visual analysis.

10. The method of claim 1, wherein recognized content regions are configured as portions of the content that are individually selectable.

11. The method of claim 1, wherein the input indicating the selection of content items is detected via input mechanisms associated with the computing device including one or more of gesture-sensitive sensors and devices for gesture detection, touch input, keyboard input and commands, mouse input, stylus input, or a microphone for voice commands.

12. The method of claim 1, wherein cycling through different combinations of content regions for inclusion in the selection includes cycling through a succession of expansions of the selection based on a hierarchy of levels within the web document.

13. The method of claim 12, wherein the hierarchy of levels within the web document includes one or more of word, line, sentence, paragraph, region, or frame.

14. The method of claim 12, wherein the control element is displayed responsive to the selection, and wherein activation of the expansion control causes the selection to expand according to the succession of expansions.

15. One or more computer-readable storage media comprising instructions stored thereon that, responsive to execution by a computing device, cause the computing device to implement a selection module configured to perform operations including:
    detecting input indicating a selection of content items included in a web document rendered via a user interface of an application;
    exposing a refinement control via the user interface in response to the selection, the refinement control including an option to initiate modification of the selection, wherein the refinement control comprises an icon selectable to expand and contract the selection by cycling through different options for the selection corresponding to different combinations of the different regions; and
    changing the selection responsive to user interaction with the refinement control to select and deselect different regions of content contained within the document.

16. One or more computer-readable storage media as recited in claim 15, further comprising processing the web document responsive to detection of the input to recognize the content regions and configuring the recognized regions as portions of the content that are individually selectable.

17. One or more computer-readable storage media as recited in claim 15, wherein the refinement control comprises a pop-up menu element including options available for the selected content items.

18. A computing device comprising:
    a processing system;
    one or more computer readable media storing instructions executable via the processing system to perform operations comprising:
    processing a web document accessed via an application to recognize different content regions within the document; and
    responsive to input obtained via toggle controls overlaid on the content regions by the application to make a selection of content items within the web document, exposing functionality via the application operable to refine the selection by toggling, using the toggle controls, selection of the different regions that are recognized.

19. The computing device of claim 18, wherein processing of the web document occurs on-demand in response to the input obtained via the application to make the selection.

20. The computing device of claim 18, wherein the processing of the web document includes:
    parsing the underlying structure of the web document to identify different discrete regions in the web document; and
    visually analyzing the web document as it appears when rendered to detect different discrete regions based on the visual analysis.

* * * * *